(12) United States Patent
Fralick et al.

(10) Patent No.: US 9,787,151 B2
(45) Date of Patent: Oct. 10, 2017

(54) RADIAL FLUX ALTERNATOR

(71) Applicant: Leidos, Inc., Reston, VA (US)

(72) Inventors: Charles R. Fralick, Ashburn, VA (US); Christopher J. Eckert, Vienna, VA (US)

(73) Assignee: Leidos, Inc., Reston, VA (US)

( * ) Notice: Subject to any disclaimer, the term of this patent is extended or adjusted under 35 U.S.C. 154(b) by 0 days.

(21) Appl. No.: 15/138,848

(22) Filed: Apr. 26, 2016

(65) Prior Publication Data

US 2016/0254710 A1    Sep. 1, 2016

Related U.S. Application Data

(63) Continuation of application No. 13/415,645, filed on Mar. 8, 2012, now Pat. No. 9,331,535.

(51) Int. Cl.
| | |
|---|---|
| *H02K 1/27* | (2006.01) |
| *H02K 3/32* | (2006.01) |
| *H02K 3/28* | (2006.01) |
| *H02K 1/14* | (2006.01) |
| *H02K 3/12* | (2006.01) |

(52) U.S. Cl.
CPC ............... *H02K 1/274* (2013.01); *H02K 1/14* (2013.01); *H02K 1/278* (2013.01); *H02K 3/28* (2013.01); *H02K 3/325* (2013.01); *H02K 3/12* (2013.01)

(58) Field of Classification Search
CPC .......... H02K 1/274; H02K 3/325; H02K 1/14; H02K 1/278; H02K 3/12; H02K 3/28
USPC .......................................................... 310/208
See application file for complete search history.

(56) References Cited

U.S. PATENT DOCUMENTS

| | | | |
|---|---|---|---|
| 1,502,511 A | 7/1924 | Marvin | |
| 2,277,095 A | 3/1942 | Fleischmann | 172/36 |
| 2,990,803 A | 7/1961 | Henderson | 114/230 |
| 3,001,371 A | 9/1961 | Gilmore, Jr. et al. | 61/48 |
| 3,070,061 A | 12/1962 | Rightmyer | 115/34 |
| 3,231,749 A | 1/1966 | Hink, III | 290/53 |
| 3,332,229 A | 7/1967 | Klinck et al. | 58/28 |
| 3,654,807 A | 4/1972 | Deskey | 73/180 |
| 3,691,573 A | 9/1972 | Laudato, Jr. | 441/16 |
| 3,763,703 A | 10/1973 | Man | 73/182 |
| 3,783,313 A | 1/1974 | Mathur | 310/49 |
| 3,800,128 A | 3/1974 | Kurk | 701/21 |
| 3,814,910 A | 6/1974 | Palmieri et al. | 701/21 |
| 3,875,388 A | 4/1975 | Luten et al. | 701/21 |
| 3,881,094 A | 4/1975 | Taylor et al. | 701/21 |
| 3,881,095 A | 4/1975 | Taylor et al. | 701/21 |
| 3,968,353 A | 7/1976 | Kuller | 701/21 |
| 4,100,441 A | 7/1978 | Landry | 310/103 |
| 4,110,630 A | 8/1978 | Hendel | 290/53 |
| 4,168,556 A | 9/1979 | Fink et al. | 114/264 |

(Continued)

OTHER PUBLICATIONS

U.S. Appl. No. 11/033,552, filed Jan. 12, 2005, Vourvopoulos, et al.

(Continued)

*Primary Examiner* — Alex W Mok
(74) *Attorney, Agent, or Firm* — Dawn-Marie Bey; Bey & Cotropia PLLC

(57) ABSTRACT

An energy conversion system includes rotor, stator and shell components configurations for increasing power efficiency and improving replacement and repair efficiency. The system harvests environmental energy for lower power generation and accounts for non-mechanical sources of rotational resistance within the generator.

15 Claims, 10 Drawing Sheets

(56) References Cited

U.S. PATENT DOCUMENTS

| | | | |
|---|---|---|---|
| 4,194,634 A | 3/1980 | Kelly | 209/589 |
| 4,266,143 A | 5/1981 | Ng | 290/53 |
| 4,317,047 A | 2/1982 | de Almada | 290/53 |
| 4,340,821 A | 7/1982 | Slonim | 290/53 |
| 4,340,936 A | 7/1982 | Mounce | 701/200 |
| 4,352,023 A | 9/1982 | Sachs et al. | 290/42 |
| 4,405,866 A | 9/1983 | Masuda et al. | 290/53 |
| 4,423,334 A | 12/1983 | Jacobi et al. | 290/53 |
| 4,438,343 A | 3/1984 | Marken | 290/53 |
| 4,490,621 A | 12/1984 | Watabe et al. | 290/42 |
| 4,527,951 A | 7/1985 | Trier | 416/145 |
| 4,531,063 A | 7/1985 | Vielmo et al. | 290/53 |
| 4,549,267 A | 10/1985 | Drabouski, Jr. | 701/124 |
| 4,594,525 A | 6/1986 | Stokes | 310/156 |
| 4,631,921 A | 12/1986 | Linderfelt | 60/501 |
| 4,674,324 A | 6/1987 | Benoit | 73/65.03 |
| 4,683,393 A | 7/1987 | Stokes | 310/156 |
| 4,708,592 A | 11/1987 | Krolick et al. | 416/176 |
| 4,748,338 A | 5/1988 | Boyce | 290/42 |
| 4,781,023 A | 11/1988 | Gordon | 60/506 |
| 4,785,404 A | 11/1988 | Sims et al. | 701/200 |
| 4,843,250 A | 6/1989 | Stupakis | 290/53 |
| 4,851,704 A | 7/1989 | Rubi | 290/53 |
| 4,872,118 A | 10/1989 | Naidenov et al. | 701/124 |
| 4,954,110 A | 9/1990 | Warnan | 441/22 |
| 5,048,356 A | 9/1991 | Levko | 74/60 |
| 5,077,549 A | 12/1991 | Hershkovitz et al. | 340/567 |
| 5,268,881 A | 12/1993 | Damm | 368/134 |
| 5,341,757 A | 8/1994 | Digiacomo | 114/230.27 |
| 5,411,422 A | 5/1995 | Robertson | 440/48 |
| 5,424,582 A | 6/1995 | Trepl, II et al. | 290/53 |
| 5,452,216 A | 9/1995 | Mounce | 701/214 |
| 5,460,099 A | 10/1995 | Matsuhisa et al. | 105/148 |
| 5,499,889 A | 3/1996 | Yim | 405/76 |
| 5,608,160 A | 3/1997 | Chastonay | 73/65.03 |
| 5,696,413 A | 12/1997 | Woodbridge et al. | 310/15 |
| 5,770,893 A | 6/1998 | Youlton | 290/53 |
| 5,783,893 A | 7/1998 | Dade et al. | 310/266 |
| 5,789,826 A | 8/1998 | Kumbatovic | 290/53 |
| 5,908,122 A | 6/1999 | Robinett et al. | 212/275 |
| 5,924,845 A | 7/1999 | Bagley et al. | 416/145 |
| 5,929,531 A | 7/1999 | Lagno | 290/53 |
| 6,020,653 A | 2/2000 | Woodbridge et al. | 290/53 |
| 6,106,411 A | 8/2000 | Edwards | 473/292 |
| 6,216,625 B1 | 4/2001 | Baluha | 114/230.27 |
| 6,255,654 B1 | 7/2001 | Verbinski et al. | 250/358.1 |
| 6,308,649 B1 | 10/2001 | Gedeon | 114/39.11 |
| 6,441,516 B1 | 8/2002 | Kaelin et al. | 310/36 |
| 6,507,025 B1 | 1/2003 | Verbinski et al. | 250/358.1 |
| 6,552,346 B2 | 4/2003 | Verbinski et al. | 250/358.1 |
| 6,600,161 B2 | 7/2003 | Desaute et al. | 250/395 |
| 6,616,402 B2 | 9/2003 | Selsam | 415/3.1 |
| 6,647,716 B2 | 11/2003 | Boyd | 60/398 |
| 6,681,572 B1 | 1/2004 | Flory | 60/507 |
| 6,823,810 B2 | 11/2004 | Carlson et al. | 114/125 |
| 6,833,631 B2 | 12/2004 | Van Breems | 290/42 |
| 6,864,614 B2 | 3/2005 | Murray | 310/216 |
| 6,953,937 B2 | 10/2005 | Reber et al. | 250/395 |
| 6,994,047 B1 | 2/2006 | Pent, III | 114/230.27 |
| 7,039,159 B2 | 5/2006 | Muenchau et al. | 378/57 |
| 7,042,110 B2 | 5/2006 | Mikhail et al. | 290/44 |
| 7,045,787 B1 | 5/2006 | Verbinski et al. | 250/358.1 |
| 7,105,939 B2 | 9/2006 | Bednyak | 290/42 |
| 7,143,363 B1 | 11/2006 | Gaynor et al. | 715/771 |
| 7,166,844 B1 | 1/2007 | Gormley et al. | 250/358.1 |
| 7,190,101 B2 | 3/2007 | Hirzel | 310/268 |
| 7,199,481 B2 | 4/2007 | Hirsch | 290/42 |
| 7,215,738 B2 | 5/2007 | Muenchau et al. | 378/57 |
| 7,239,038 B1 | 7/2007 | Zimmerman et al. | 290/53 |
| 7,298,054 B2 | 11/2007 | Hirsch | 290/42 |
| 7,335,887 B1 | 2/2008 | Verbinski et al. | 250/358.1 |
| 7,352,844 B1 | 4/2008 | Muenchau et al. | 378/57 |
| 7,362,004 B2 | 4/2008 | Becker | 290/55 |
| 7,365,332 B2 | 4/2008 | Verbinski et al. | 250/358.1 |
| 7,368,717 B2 | 5/2008 | Verbinski et al. | 250/358.1 |
| 7,375,436 B1 | 5/2008 | Goldin | 290/42 |
| 7,388,205 B1 | 6/2008 | Verbinski et al. | 250/358.1 |
| 7,388,209 B1 | 6/2008 | Gormley et al. | 250/370.11 |
| 7,408,160 B2 | 8/2008 | Verbinski et al. | 250/358.1 |
| 7,430,479 B1 | 9/2008 | Holslin et al. | 702/22 |
| 7,436,082 B2 | 10/2008 | Ruse et al. | 290/42 |
| 7,440,848 B2 | 10/2008 | Anderson | 701/207 |
| 7,453,165 B2 | 11/2008 | Hench | 290/53 |
| 7,453,987 B1 | 11/2008 | Richardson | 378/98.9 |
| 7,538,445 B2 | 5/2009 | Kornbluh et al. | 290/53 |
| 7,557,456 B2 | 7/2009 | Kornbluh et al. | 290/42 |
| 7,596,275 B1 | 9/2009 | Richardson et al. | 382/224 |
| 7,625,255 B2 | 12/2009 | Ide et al. | 440/88 M |
| 7,629,704 B2 | 12/2009 | Hench | 290/53 |
| 7,649,276 B2 | 1/2010 | Kornbluh et al. | 290/53 |
| 7,742,568 B2 | 6/2010 | Smith | 378/98.11 |
| 7,957,506 B2 | 6/2011 | Smith | 378/57 |
| 8,116,431 B2 | 2/2012 | Smith | 378/98.11 |
| 8,314,528 B2 | 11/2012 | Shinohara | 310/194 |
| 8,598,536 B2 | 12/2013 | Jarron et al. | 250/395 |
| 8,618,495 B2 | 12/2013 | De Geronimo | 250/395 |
| 2001/0000197 A1 | 4/2001 | Gorlov | 114/274 |
| 2002/0047427 A1 | 4/2002 | Shiga et al. | 310/156.13 |
| 2003/0122084 A1 | 7/2003 | Desaute et al. | 250/395 |
| 2003/0173922 A1 | 9/2003 | Pelonis | 318/439 |
| 2003/0214196 A1 | 11/2003 | Cai et al. | 310/208 |
| 2004/0021391 A1 | 2/2004 | Jones | 310/208 |
| 2004/0046474 A1 | 3/2004 | Kalsi | 310/179 |
| 2004/0084980 A1 | 5/2004 | Yamaguchi et al. | 310/81 |
| 2004/0239199 A1 | 12/2004 | Qu et al. | 310/114 |
| 2005/0285407 A1 | 12/2005 | Davis et al. | 290/54 |
| 2006/0279153 A1 | 12/2006 | Barreiro | 310/114 |
| 2007/0137195 A1 | 6/2007 | Tayla et al. | 60/397 |
| 2007/0138793 A1 | 6/2007 | Zimmerman et al. | 290/1 R |
| 2007/0251230 A1 | 11/2007 | Zimmerman et al. | 60/497 |
| 2007/0278876 A1 | 12/2007 | Haga et al. | 310/71 |
| 2008/0024030 A1 | 1/2008 | Saboi et al. | 310/208 |
| 2008/0054639 A1 | 3/2008 | Maier et al. | 290/40 |
| 2008/0093858 A1 | 4/2008 | Hench | 290/53 |
| 2008/0224472 A1 | 9/2008 | Bean | 290/42 |
| 2008/0265582 A1 | 10/2008 | Hench | 290/53 |
| 2009/0008942 A1 | 1/2009 | Clement et al. | 290/53 |
| 2009/0127856 A1 | 5/2009 | Hench | 290/42 |
| 2009/0160191 A1 | 6/2009 | Beane | 290/53 |
| 2010/0072752 A1 | 3/2010 | Park et al. | 290/52 |
| 2010/0123315 A1 | 5/2010 | Anderson, Jr. | 290/53 |
| 2010/0148512 A1 | 6/2010 | Pitre | 290/54 |
| 2010/0181491 A1 | 7/2010 | Karim et al. | 250/394 |
| 2011/0012358 A1 | 1/2011 | Brewster et al. | 290/53 |
| 2011/0115326 A1 | 5/2011 | Clark et al. | 310/114 |
| 2011/0278847 A1 | 11/2011 | Hench et al. | 290/53 |
| 2013/0057323 A1 | 3/2013 | Spini et al. | 327/142 |

OTHER PUBLICATIONS

International Search Report and Written Opinion issued for PCT/US2009/031675, dated Mar. 30, 2009, 8 pp.

Timmons, Heather, "Energy From the Restless Sea," The New York Times, Aug. 3, 2006, New York, New York.

"noah li-leger" [online], The Creative World at Work, Copyright 2010 [retrieved on Apr. 16, 2010], 1 p., Retrieved from the Internet: http://www.coroflot.com/public/individual_profile.asp?individual_id=140221&sort_by=1&.

"UBC Entrepreneurs Harness Wave Energy" [online], UBC This Week, Mar. 9, 2006 [retrieved on Apr. 16, 2010], 4 pp., Retrieved from the Internet: http://www.publicaffairs.ubc.ca/ubcthisweek/2006/06mar09.html.

"Wavelength—Wavelength Power Solutions" [online], The Creative World at Work, Copyright 2010 [retrieved on Apr. 16, 2010], 4 pp., Retrieved from the Internet: http://www.coroflot.com/public/individual_file.asp?individual_id=140221&portfolio_id=342501&sort_by=1&.

Khan, Jahangir and Bhuyan, Gouri S., "Ocean Energy: Global Technology Development Status," A report prepared by Powertech Labs Inc. for the IEA-OES under Annex I—Review, Exchange and Dissemination of Information on Ocean Energy Systems, IEA-OES Document No. T0104, 83 pp., Mar. 2009.

(56) References Cited

OTHER PUBLICATIONS

Brekken, T.K.A., von Jouanne, A. Hai Yue Han, "Ocean Wave Energy Overview and Research at Oregon State University," School of Electr. Eng. & Comp. Sci., Oregon State University, Corvallis OR, Power Electronics and Machines in Wind Applications, PEMWA 2009, IEEE, Jun. 24-26, 2009.
"Wind Turbine Power Calculations, RWE npower renewables" [online], Mechanical and Electrical Engineering, Power Industry, The Royal Academy of Engineering, [retrieved on Feb. 24, 2011], 5 pp., Retrieved from the Internet: http://www.raeng.org.uk/education/diploma/maths/pdf/exemplars_advanced/23_Wind_Turbine.pdf.
"Producing Renewable Electricity with a Hybrid, Bluenergy Solarwind Turbine," 2 pp., Copyright 2009-2011, www.blueenergyusa.com.
"Development of the Helical Reaction Hydraulic Turbine," Final Technical Report, Project Period: Jul. 1, 1996-Jun. 30, 1998, Submission to: The US Department of Energy, Prepared by: Dr. Alexander Gorlov, PI, MIME Department, Northeastern University, 59 pp., Aug. 1998.
Rasila, Mika, "Torque and Speed Control of a Pitch Regulated Wind Turbine," Department of Electric Power Engineering, Chalmers University of Technology, Goteborg, Sweden, 67 pp., 2003.
International Search report and Written Opinion for Application No. PCT/US2011/027635, dated May 25, 2011, 9 pp.
Specification and Drawings for U.S. Appl. No. 12/778,586, filed May 12, 2010, 20 pp.
Alves, Marco, et al., "Hydrodynamic Optimization of a Wave Energy Converter Using a Heave Motion Buoy," Proceedings of the 69th Int. Conf. on Wave and Tidal Energy, Porto, Portugal, 2007.
"Pelamis Wave Energy Converter" [online], [retrieved on Apr. 23, 2012], 4 pp., Retrieved from the Internet: http://en.wikipedia.org/wiki/Pelamis_Wave_Energy_Converter.
Evans, Paul, "Ocean-Power Installation Up and Running," gizmag, Mar. 2, 2009 [retrieved on Apr. 23, 2012], 5 pp., Retrieved from the Internet: http://www.gizmag.com/wave-power-owe/11122/.
Von Jouanne, A., Brekken, T.K.A., "Creating Energy From Ocean Waves" [online], Wallace Energy Systems & Renewables Facility, Oregon State University, Copyright 2012 [retrieved on Apr. 23, 2012], 2 pp., Retrieved from the Internet: http://eecs.engr.oregonstate.edu/wesrf.
World Energy Council, "2007 Survey of Energy Resources," Ocean Thermal Energy Conversion, 9 pp.
Kane, M., "California Small Hydropower and Ocean Wave Energy Resources," in Support of the 2005 Integrated Energy Policy Report, Presented at: California Energy Commission, Sacramento, California, 29 pp., May 9, 2005.
Previsic, Mirko, et al., "E21 EPRI Assessment, Offshore Wave Energy Conversion Devices," Electricity Innovation Institute, 52 pp., Jun. 16, 2004.
Bedard, Roger, "Feasibility of Using Wavewatch III for Days-Ahead Output Forecasting for Grid Connected Wave Energy Projects in Washington and Oregon, Stage Gate #2 Final Report, EPRI-WP012," Electric Power Research Institute, 78 pp., Feb. 29, 2008.
Bedard, Roger, et al., "North American Ocean Energy Status—Mar. 2007," 8 pp.
Rondorf, Neil, "A Virginia-Based Marine Renewable Energy Technologies," Presentation to VRTAC, 19 pp., Sep. 19, 2006.
Koola, Paul Mario, et al., "The Dynamics of Wave Carpet, a Novel Deep Water Wave Energy Design," Oceans 2003 Proceedings, vol. 4, pp. 2288-2293, Sep. 22-26, 2003, San Diego, California.
Kim, Jin-Ha, et al., "An Experimental Study on the Reverse Wave Drift Force of a BBDB Type OWC Wave Energy Device," Proceedings of the Seventh (2006) ISOPE Pacific/Asia Offshore Mechanics Symposium, pp. 237-242, Dalian, China, Sep. 17-21, 2006.
"Linear Control of Wave Energy Converters" [online], Lancaster University Renewable Energy Group—Wave Energy [retrieved on Jun. 12, 2012], 3 pp. Retrieved from the Internet: http://engineering.lancs.ac.uk/lureg/group_research/wave_energy_research_Linear_C . . .
"Wooden Low-Rpm Alternator" [online], Copyright 2000 [retrieved on Mar. 29, 2012], 15 pp., Retrieved from the Internet: http://www.otherpower.com/pmg2.html.

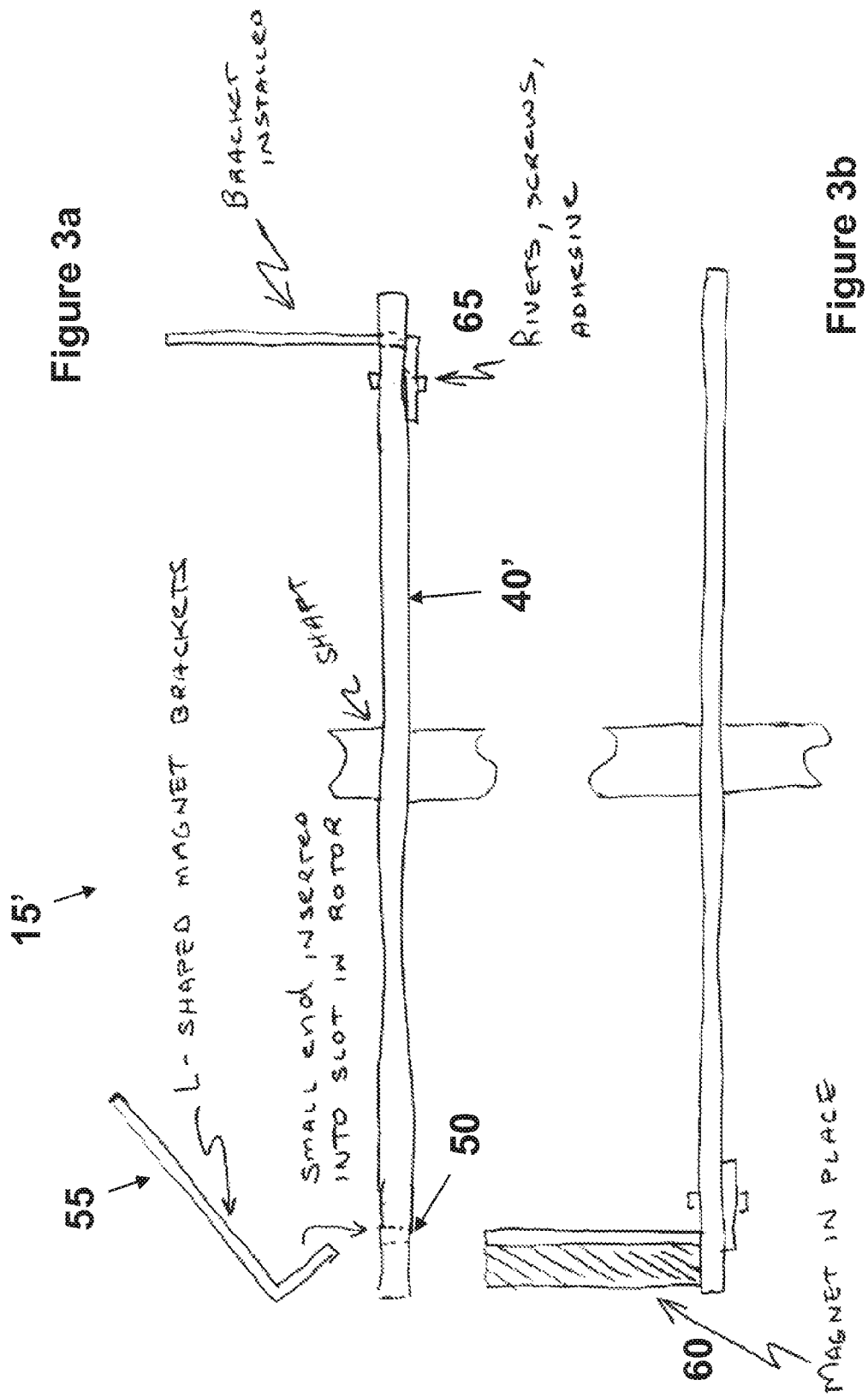

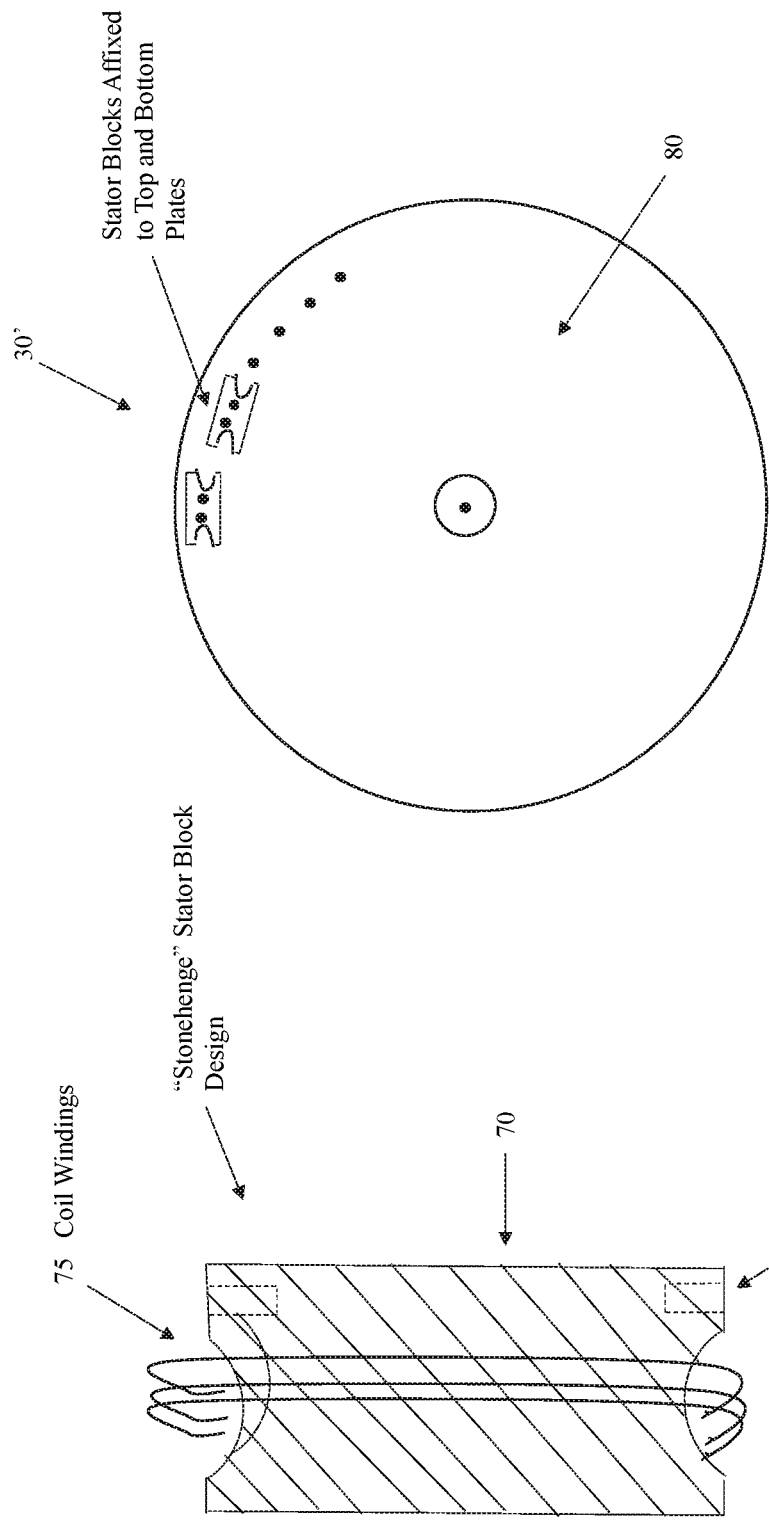

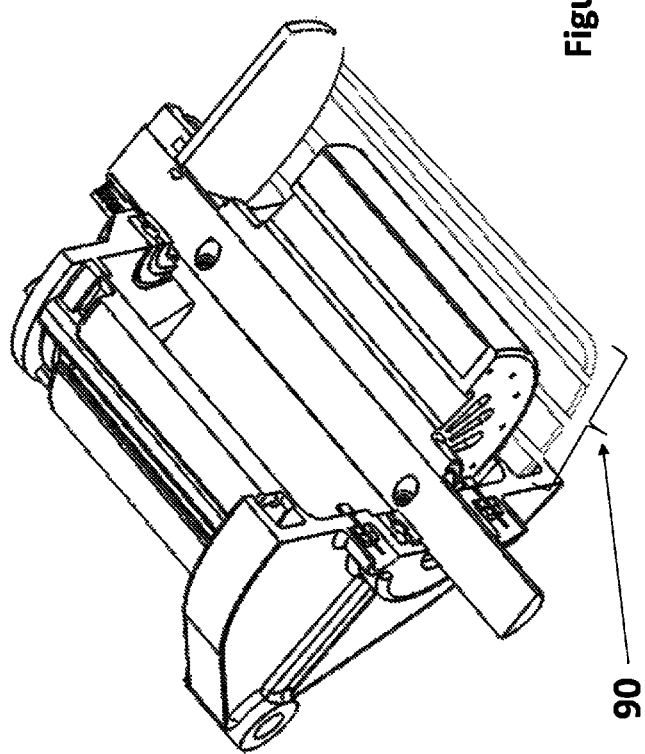

RADIAL FLUX ALTERNATOR

CROSS-REFERENCE TO RELATED APPLICATION

The present application is a continuation of U.S. application Ser. No. 13/415,645, filed Mar. 8, 2012, titled "Radial Flux Alternator," the subject matter of which is incorporated herein by reference in its entirety. U.S. patent application Ser. No. 12/778,586 entitled "Radial Flux Permanent Magnet Alternator With Dielectric Stator Block" is related to the subject matter described herein, subject to common ownership and incorporated herein by reference in its entirety.

BACKGROUND OF THE INVENTION

Field of the Invention

Efficient dynamo-based production of electrical power in environmental energy harvesting and other applications in which the dynamo rotor is driven at low and variable revolutions per minute. Specific applications include, by way of example, powering systems aboard unmanned maritime platforms and harvesting wind power generation.

Description of the Related Art

Extraction of useful energy from locally available environmental sources is becoming vitally important to a wide range of applications, and immediately so for remote sensing and communications devices for military and civilian uses. A common element in all devices that harvest environmental energy from kinetic sources such as moving wind or water is the electrical dynamo, which must be capable of operating without an external source of current and therefore typically utilizes permanent magnets. Numerous electrical dynamo designs exist and are patented. In particular, these designs include vertical and horizontal axis wind turbines and kinetic power pendulum-type devices which respond to X-Y forces (with respect to the pendulum's rotational axis).

One of the problems associated with high-efficiency, radial flux, permanent magnet alternators is cost of fabrication when the rotor size exceeds 5 or 6 inches. The cost of rare earth magnets dominates the cost equation today, so any reduction in the cost of other components presents opportunities to reduce overall cost.

Accordingly, there is a perpetual need in the alternator (dynamo) art for improved technical designs which balance intended application, size, costs and other factors to meet efficiency demands.

BRIEF SUMMARY OF THE INVENTION

In a first exemplary embodiment, an energy conversion system includes: a cylindrical rotor including a mass and multiple magnets affixed on an outer face thereof; a cylindrical stator including one or more dielectric components wound with copper wire in a predetermined configuration, the cylindrical rotor being placed within the cylindrical stator; a shell component rotatably connected with the cylindrical rotor, wherein the cylindrical rotor and the cylindrical stator are located within a circumference of the shell component; and a rotatable shaft for simultaneously rotating the cylindrical rotor and the shell component, the rotatable shaft being placed in the center of the cylindrical rotor.

In a second exemplary embodiment, an energy conversion system includes: a cylindrical rotor including a mass and a round plate with multiple magnets affixed on the periphery thereof by individual L-brackets each of which has a short section and a long section, the individual L-brackets being secured to the plate by threading a short section thereof through individual openings along the periphery and securing one of the multiple magnets to the long section of each L-bracket; a cylindrical stator including one or more dielectric components wound with copper wire in a predetermined configuration, the cylindrical rotor being placed within the cylindrical stator; and a rotatable shaft for rotating the cylindrical rotor, the rotatable shaft being placed in the center of the cylindrical rotor.

In a third exemplary embodiment, an energy conversion system includes: a cylindrical rotor including a mass and a round plate with multiple magnets affixed on the periphery thereof by individual L-brackets each of which has a short section and a long section, the individual L-brackets being secured to the plate by threading a short section thereof through individual openings along the periphery and securing one of the multiple magnets to the long section of each L-bracket; a cylindrical stator including multiple dielectric components each having a length and width and having notches at a top and bottom of the length thereof, wherein each of the multiple dielectric components includes a piece of copper wire wound around the length of the component through the top and bottom notches, the cylindrical rotor being placed within the cylindrical stator; a shell component rotatably connected with the cylindrical rotor, wherein the cylindrical rotor and the cylindrical stator are located within a circumference of the shell component; and a rotatable shaft for simultaneously rotating the cylindrical rotor and the shell, the rotatable shaft being placed in the center of the cylindrical rotor.

BRIEF DESCRIPTION OF THE FIGURES

The following figures are intended to be illustrative of the exemplary embodiments of the present invention and are to be considered in conjunction with the descriptions provided herein.

FIGS. 3a through 3c illustrate an energy conversion system rotor in accordance with an exemplary embodiment described herein;

FIGS. 4a and 4b illustrate an energy conversion system stator in accordance with an exemplary embodiment described herein; and FIGS. 5a through 5e illustrate an energy conversion system with shell rotor in accordance with an exemplary embodiment described herein.

DETAILED DESCRIPTION OF THE INVENTION

Figure 1:
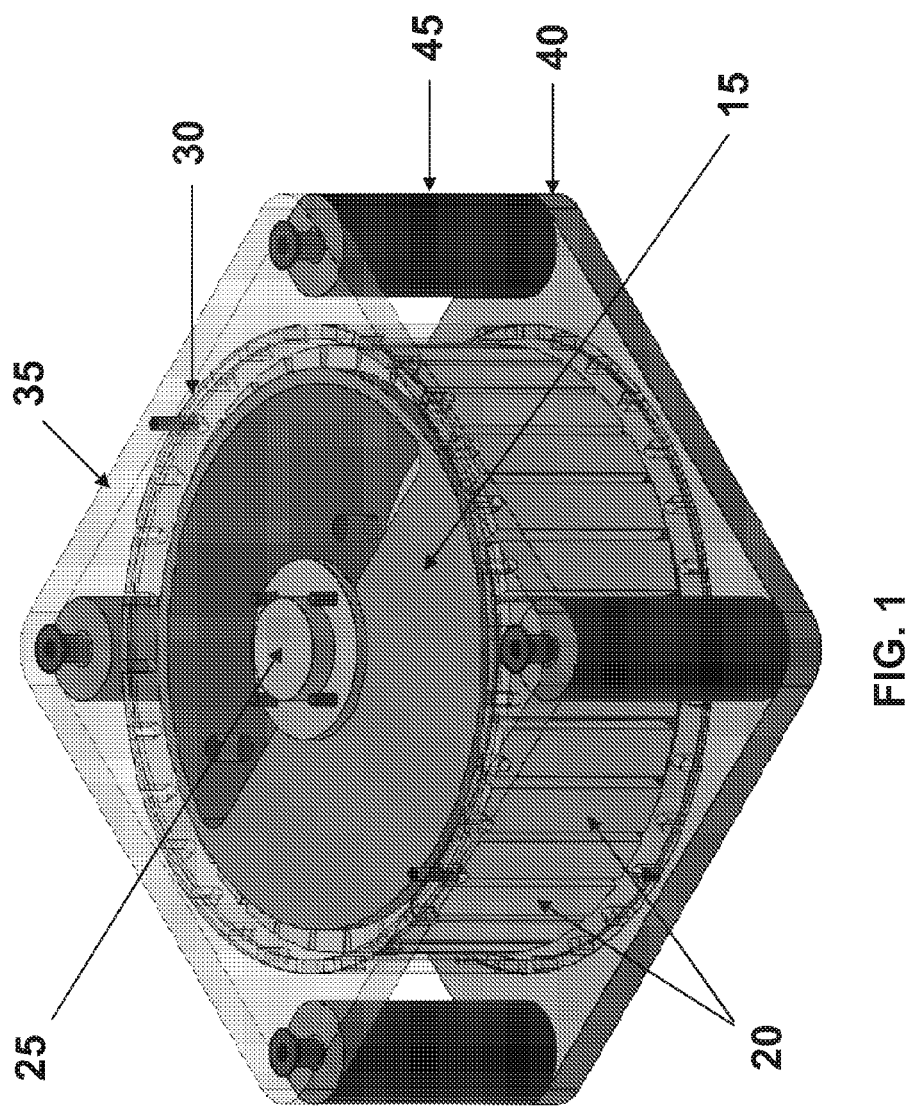
FIG. 1 illustrates an energy conversion system in accordance with an exemplary embodiment described in U.S. patent application Ser. No. 12/778,586.
Figure 2:
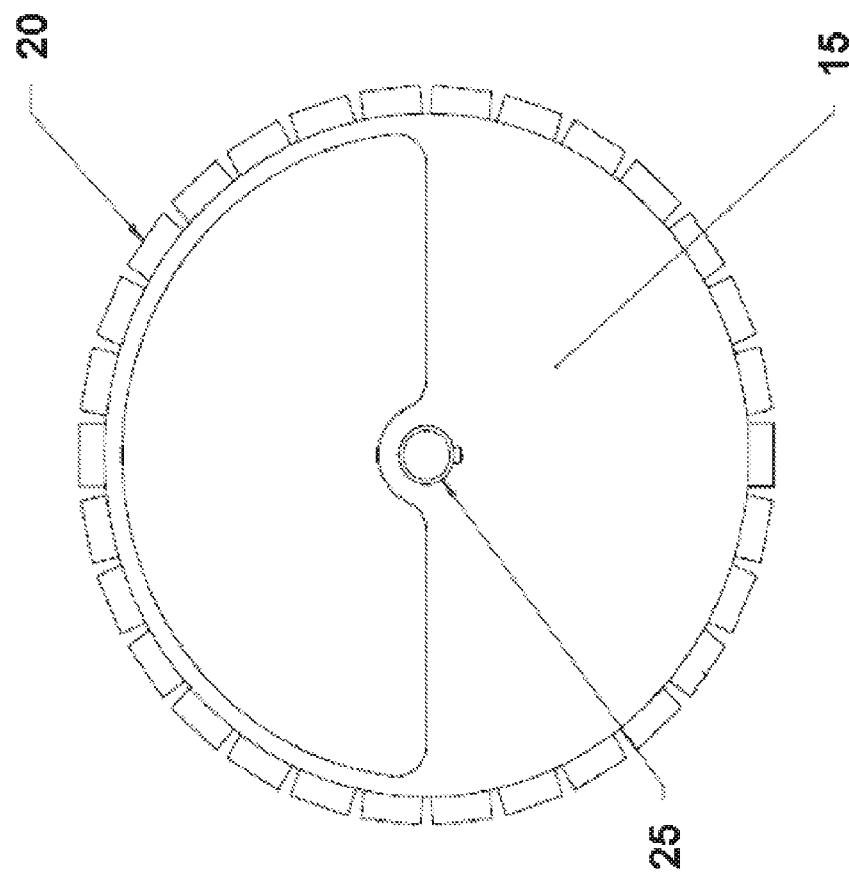
FIG. 2 illustrates an energy conversion system rotor in accordance with an exemplary embodiment described in U.S. patent application Ser. No. 12/778,586.

An exemplary energy conversion system 10 in a radial flux configuration is shown in FIG. 1 and includes at least the following components: a rotor assembly including rotor 15, magnets 20, shaft 25; stator 30; upper plate 35 (optional); lower plate 40 (optional) and spacers 45 (optional). A top view of just the stator portion of the prior art system in shown in FIG. 2. The rotor and stator assembly could stand alone or, alternatively, be held together with an upper plate 35, lower plate 40 and spacers 45 formed of non-conductive material, such as fiberglass. In order to avoid the need for metal bolts or screws, the plates can be machined with a groove that matched the circumference of the stator so that the stator fits snuggly within the groove. The groove may also have raised teeth or pins (of nonconductive material) that interlock with one or more stator slots to prevent rotation of the stator.

Figure 3C:
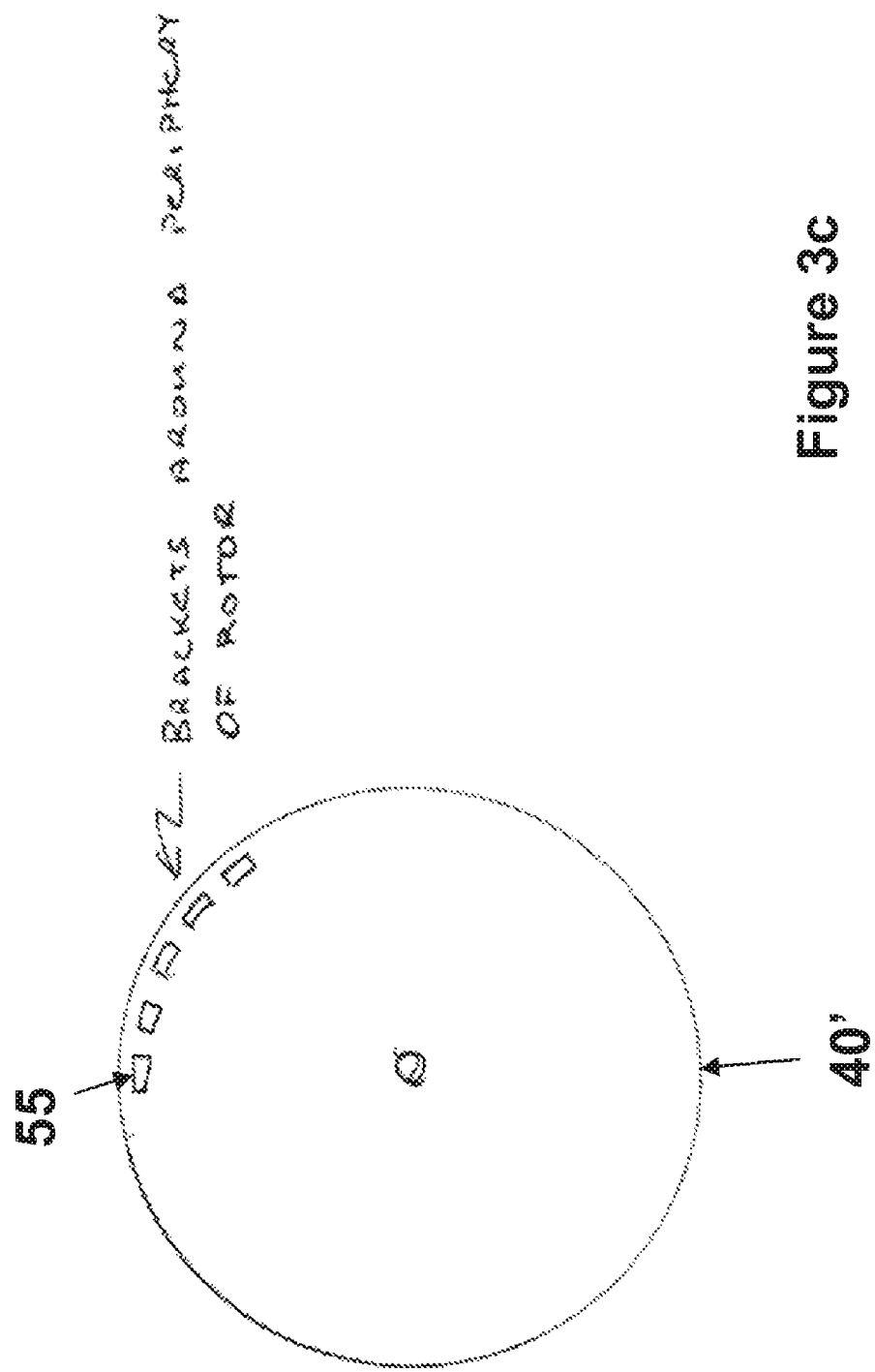

Referring to FIGS. 3a through 3c an alternative rotor design 15' makes use of low cost metal and non-metal components to achieve cost savings. A circular steel plate 40' has rectangular slots 50 cut around the periphery to accept brackets 55 that will hold magnets 60. The brackets 55 are L-shaped with the smaller portion of the L passing through the top of the circular plate and tilted so that is rest flat against the bottom of the rotor plate. The bracket can then be riveted, welded, screwed or otherwise held in place 65. The advantages of this design include cost reduction, strength and easy scalability. No complex shapes or expensive machining is required.

With the design illustrated in FIGS. 3a through 3c, the magnet size, the number of magnets desired, and the diameter of the rotor then determine the number of magnets affixed to the rotor.

Referring to FIGS. 4a and 4b, an alternative stator for use with the rotor shown in FIGS. 3a through 3c, consists of individual stator blocks 70 that make up individual coils in the construction. More particularly, grooved rectangular blocks allow coil wire 75 to be readily and quickly wound around them. The individually wound blocks 70 are then affixed to non-conducting top and bottom plates (only one plate 80 shown) by pins, screws, adhesive or other mechanism (see exemplary holes 78) for securing to form an alternative circular stator assembly 30'.

The alternative rotor and stator designs may be used together to form an alternator or individually with other stator and rotor variations, such as those described in U.S. patent application Ser. No. 12/778,586 entitled RADIAL FLUX PERMANENT MAGNET ALTERNATOR WITH DIELECTRIC STATOR BLOCK which is incorporate herein by reference. The alternative designs reduce costs because there are no complicated shapes, no time-consuming machining, and no exotic materials required to build the alternator. Assembly time is minimal and individual components, e.g., magnets/brackets and/or stator blocks, can be replaced in the field if required. Similar to FIG. 1, the alternative circular stator assembly would be mounted on non-conductive housing material with bearings inserted top and bottom for the rotor shaft.

Figure 5A:
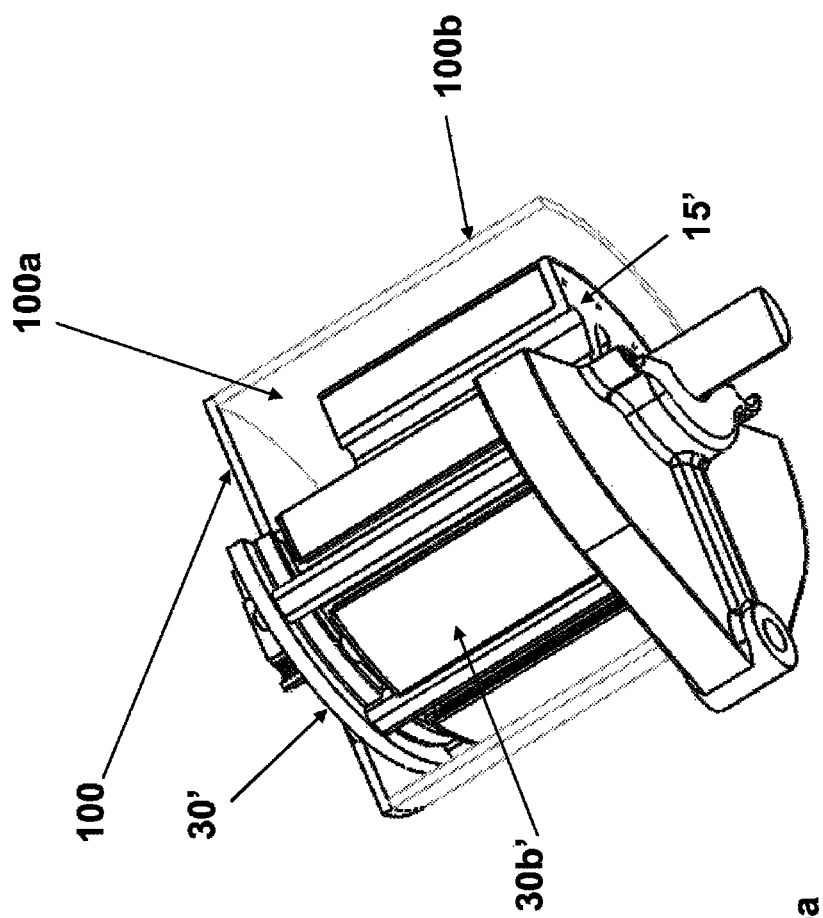
Figure 5B:
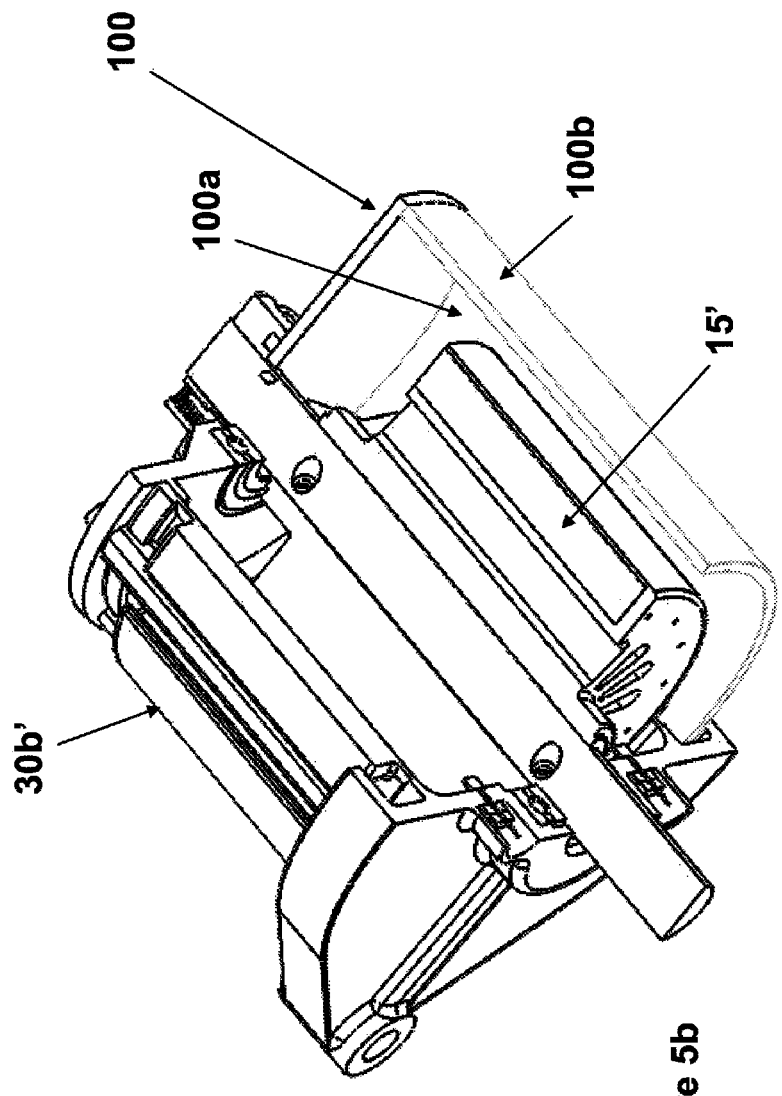
Figure 5C:
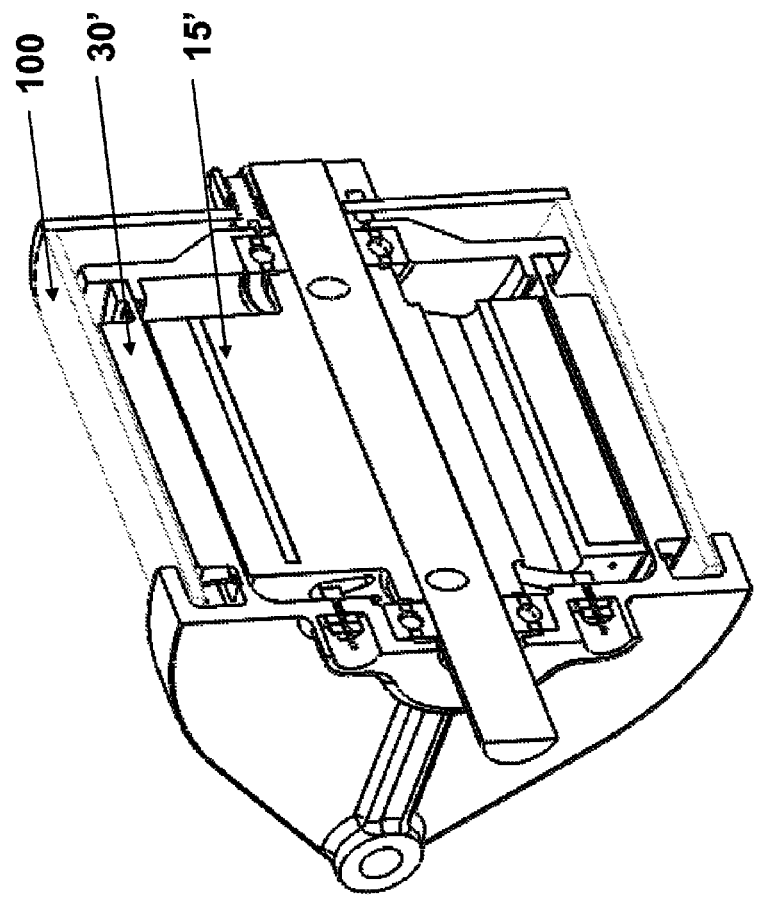
Figure 5D:
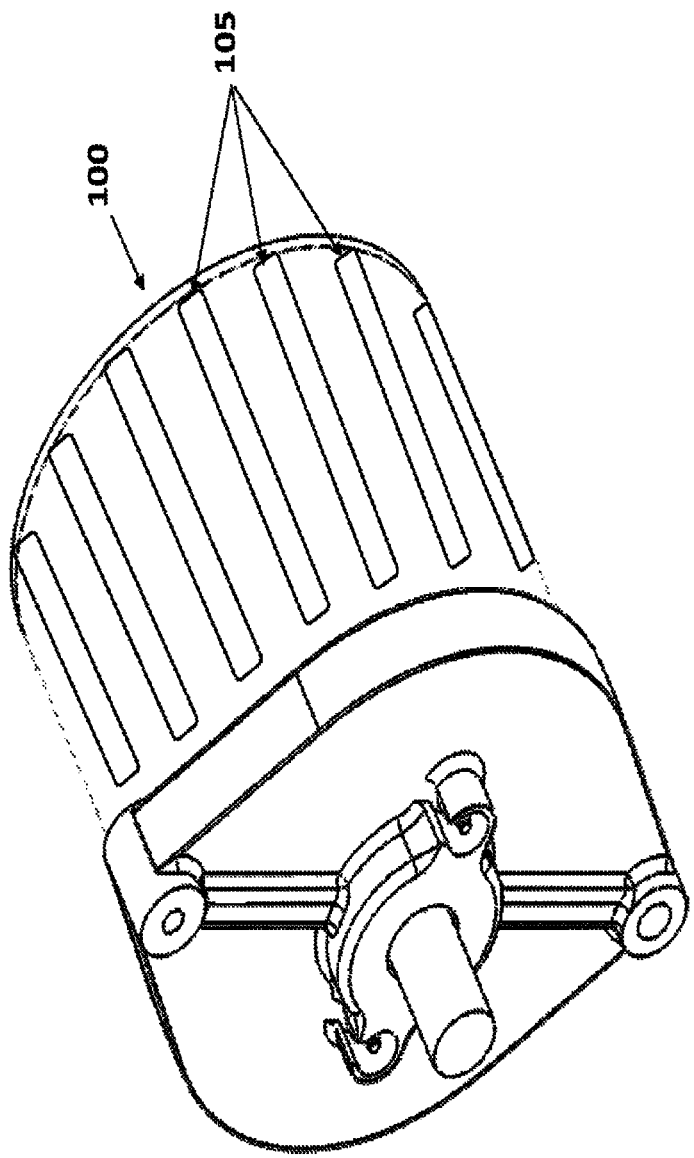

Referring to FIGS. 5a-5e, one or more of the alternator designs described herein or in U.S. patent application Ser. No. 12/778,586, may benefit from the addition of a rotating shell 100 having inside diameter 100a and outside diameter 100b. The thickness of the shell is determined by structural considerations (larger units requiring more material for rigidity and strength) and weight limitations. A practical lower limit is 16 gauge for smaller units. Flux extension as a result of thickness has been determined to be adequate with 16 gauge material. The shell 100 rotates with the rotor so that there is no relative motion between the rotating shell and the rotor. The shell is formed of a ferro-magnetic material such as many alloys of steel, cobalt, chromium (IV) oxide, ferrite, iron, magnetite, neodymium, permalloy, and samarium-cobalt. The rotating shell functions to pull or extend the magnetic flux through the stator windings at a higher average flux than if the shell is absent. The rotating shell does not generate eddy current and associated Lorentz losses since it is rotating with the rotor. Accordingly, the addition of a rotating shell described herein increased the power density of the alternators. For optimum power efficiency, the shell is constructed such that it's inside diameter 100a is as close to the outside diameter 30b of the stator as possible without contacting the stator. Though the shell as illustrated in FIGS. 5a-5c is shown as a continuous piece of material, it is also contemplated that the shell could alternatively be formed of individual strips of material 90 placed opposite of the locations of the magnets per FIG. 5e. Or as a variation thereto, the shell could be formed so as to have cut-outs 105 in the locations thereon that are opposite non-magnet portions of the rotor as depicted in FIG. 5d. The alternatives to the continuous shell result in reduced weight and may advantageously take advantage of secondary electromagnetic phenomena such as smoothing field flux lines and breaking up eddy flows within larger diameter, high current conductors.

In operation, the shell effectively shields the magnetic flux of the permanent magnets outside the alternator to a level that is near background noise. This is important for a number of reasons. Many electronics are sensitive to strong magnetic fields and can be damaged, malfunction, or have skewed readings of sensors. As a result, the shell rotor allows more tightly packed integrated systems in which the buffer between the alternator and any sensitive electronics can effectively be eliminated. Further the distance in which the alternator and its housing must be constructed of dielectric/non-conductive materials is reduced. This simplifies design and reduces cost. For example, without the shell, magnetic flux ½ an inch from the surface can be as high as 1000 gauss. With the shell, at the shell surface it is in the range of 10-15 gauss.

The energy conversion systems described herein are based on the use of permanent magnets in what is known as a radial flux configuration. The configuration is brushless and results in much greater swept coil area in the same footprint as an axial-flux design and is well suited to low rotational speed applications as low as approximately 1 rpm. In a particular embodiment, various exemplary materials and configurations include neodymium magnets, steel rotor and shaft with an unbalanced mass. One skilled in the art recognizes that the number and spacing of magnets is changeable in accordance with optimization parameters. Similarly, rotor material and configuration, e.g., hollow, solid, unbalanced, can also be manipulated in accordance with end use requirements. These variations fall within the scope of the invention. The stators are preferably air-core with copper wiring and dielectric materials such as fiberglass. The use of dielectric material reduces or eliminates eddy current drag forces, which otherwise oppose rotation of the rotor even when the stator coil circuit is open (no load). Examples of dielectric materials that are suitable include non-carbon composites such as fiberglass/eGlass, phenolic resins, plastics, polycarbonate, wood, 3-D printed plastics (such as glass-reinforced nylon), and glass.

As suggested herein, there are various combinations of rotors (15, 15'), stators (30, 30') and stator shell 100 configurations and material substitutions that may be implemented in accordance with size, power requirements, weight restrictions, material costs. For example, a smaller footprint alternator using the shell and smaller (less expensive) magnets could produce the same power output as a larger footprint alternator with no shell. One skilled in the art recognizes the trade-offs and advantages resulting from the configurations described herein.

The exemplary configurations described above result from the identification and neutralization of detracting forces previously overlooked and insignificant in the generator field. Specifically, for harvesting at low rotational speeds to produce relatively low power, e.g., on the order of watts, the configurations described herein minimize sources of non-mechanical rotational resistance caused by, for example, the buildup of eddy currents and cogging forces in ferrous or conductive elements in motion-relative components of a permanent magnet alternator. In theory, the spin-down time for a dynamo should be governed by the friction in its bearings and with the air. A low-friction device should have a relatively long spin-down time. However, it can be readily shown that typical generators have very short spin-down times, even when no electrical load is applied. Laboratory experiments and application of theory (Lenz, Maxwell, and Faraday), led researchers to the conclusion that these excess forces are the result of eddy current drag, which is overlooked when a powerful prime mover such as an internal combustion engine is used. In fact, this eddy current drag is a significant source of "friction" and is released in the form of heat in the generator. Utilizing the configurations described herein, the spin down time can be increased from several seconds to several minutes as a direct result of the application of these principles in the form of dielectric construction materials. This approach is distinctive from prior art configurations, even those identified as having a "substantially ironless" stator, as some steel is used to help direct the magnetic fields—resulting in some cogging. The exemplary embodiments described herein eliminate the presence of iron, conductive, or otherwise magnetically interactive materials from the vicinity of the stator or alternator housing.

To that end, the configurations are constructed to utilize dielectric structural materials to prevent counter-electromagnetic field (EMF) or eddy currents in certain structural components. This includes the materials use for the stator block, top and bottom plates, and structural elements such as legs, and outer housing. The exemplary configurations are able to produce useful voltages at very low rotational speeds, eliminating the requirements for step-up gearing from low-speed, high-torque input (also known as break-out torque), which is frequently encountered with various "renewable" energy harvesting technologies, including: wind turbines, both horizontal and vertical (e.g., Savonius, Darrius); Riverine and tidal current turbines and drogues; and certain types wave energy conversion (WEC) devices.

Operation at very low rotational speeds offers the following advantages: enables direct 1:1 rotational speed with wind turbines and kinetic reaction mass devices (wave energy); reduces or eliminates the requirement for transmissions and gearboxes, which reduces costs and complexity and scheduled maintenance requirements while increasing reliability and mean time to failure, which is important in remote marine applications; reduces or eliminates the requirement for precision balancing of the rotor to manage vibration, with cost savings; reduces wear on bearings; relaxes structural considerations due to very high centrifugal forces of high-speed rotors; generates less mechanical friction heating; increases mechanical reliability; reduces eddy current reaction in the permanent magnets, reducing heating in the magnets and improving performance and lifetime.

The exemplary system described herein has unlimited applicability. While immediate applications for the technology include remote low power applications such as individual ocean buoys in the single digit watt power output range, the scalability of the technology would allow for power output up to an excess of 100 kilowatts. Other potential uses include unmanned maritime platforms and remote cellular communications power stations. The exemplary embodiment described above generates output power in the range of approximately 2 to 20 watts. The energy conversion system is intended to be a plug-and-play generator where output wires can be connected directly to a power supply, e.g., such as the payload power supply on a buoy.

The embodiments set forth herein are intended to be exemplary of the described inventive concepts and are in no way intended to limit the scope of the invention thereto. One skilled in the art recognizes the numerous variations that are inherently contemplated by the invention as described.

The invention claimed is:

1. An alternator with reduced external magnetic flux comprising:
   a rotor including a mass and multiple magnets affixed on an outer face thereof, the multiple magnets being position on the outer face such that non-magnetic portions of the outer face are included therebetween;
   multiple individual dielectric stator blocks wound with copper wire, each of the multiple individual dielectric stator blocks being positioned so as to face one of the multiple magnets of the rotor and being in close proximity thereto without contacting the multiple magnets;
   a ferro-magnetic shell component rotatably connected with the rotor by a rotatable shaft for simultaneously rotating the rotor and the ferro-magnetic shell component so that there is no relative motion therebetween, wherein the multiple individual dielectric stator blocks are located between the rotor and the ferro-magnetic shell component, and further wherein the ferro-magnetic shell component has cutouts in locations opposite the non-magnetic portions of the outer face of the rotor.

2. The alternator of claim 1, wherein each of the multiple individual dielectric stator blocks is attached around a periphery of a stator plate.

3. The alternator of claim 1, wherein each of the multiple individual dielectric stator blocks includes an air core.

4. The alternator of claim 1, wherein each of the multiple individual dielectric stator blocks is selected from the group consisting of fiberglass, phenolic resin, plastic, polycarbonate, wood, glass-reinforced nylon, and glass.

5. The alternator of claim 1, wherein the ferro-magnetic shell has at least a 16 gauge thickness.

6. The alternator of claim 1, wherein the ferro-magnetic shell is formed of a material selected from the group consisting of steel, cobalt, chromium (IV) oxide, ferrite, iron, magnetite, neodymium, permalloy, and samarium-cobalt.

7. The alternator of claim 1, wherein the magnets are formed of neodymium.

8. An alternator with reduced external magnetic flux comprising:
   a rotor including a mass and multiple magnets affixed on an outer face thereof, the multiple magnets being position on the outer face such that non-magnetic portions of the outer face are included therebetween;
   multiple individual dielectric stator blocks wound with copper wire, each of the multiple individual dielectric stator blocks being positioned so as to face one of the multiple magnets of the rotor and being in close proximity thereto without contacting the multiple magnets;
   multiple strips of ferro-magnetic material positioned opposite each of the multiple magnets and rotatably connected with the rotor by a rotatable shaft for simultaneously rotating the rotor and the multiple strips of ferro-magnetic material so that there is no relative motion therebetween, wherein the multiple individual dielectric stator blocks are located between the rotor and the multiple strips of ferro-magnetic material.

9. The alternator of claim 8, wherein each of the multiple individual dielectric stator blocks is attached around a periphery of a stator plate.

10. The alternator of claim 8, wherein each of the multiple individual dielectric stator blocks includes an air core.

11. The alternator of claim 8, wherein each of the multiple individual dielectric stator blocks is selected from the group consisting of fiberglass, phenolic resin, plastic, polycarbonate, wood, glass-reinforced nylon, and glass.

12. The alternator of claim 8, wherein each of the multiple ferro-magnetic strips has at least a 16 gauge thickness.

13. The alternator of claim 8, wherein each of the multiple ferro-magnetic strips is formed of a material selected from the group consisting of steel, cobalt, chromium (IV) oxide, ferrite, iron, magnetite, neodymium, permalloy, and samarium-cobalt.

14. The alternator of claim 8, wherein the magnets are formed of neodymium.

15. An alternator with reduced external magnetic flux comprising:

a cylindrical steel rotor including a mass and multiple magnets affixed on an outer face thereof, the multiple magnets being position on the outer face such that non-magnetic portions of the outer face are included therebetween;

multiple individual fiberglass stator blocks wound with copper wire, each of the multiple individual fiberglass stator blocks being positioned so as to face one of the multiple magnets of the rotor and being in close proximity thereto without contacting the multiple magnets;

a ferro-magnetic shell component rotatably connected with the rotor by a rotatable shaft for simultaneously rotating the rotor and the ferro-magnetic shell component so that there is no relative motion therebetween, wherein the multiple individual dielectric stator blocks are located between the rotor and the ferro-magnetic shell component, and further wherein there is no ferro-magnetic shell material located opposite the non-magnetic portions of the outer face of the rotor.

* * * * *